C. S. COCHRAN.
PIPE THREADING TOOL.
APPLICATION FILED OCT. 25, 1910.
1,017,853.
Patented Feb. 20, 1912.
2 SHEETS—SHEET 1.
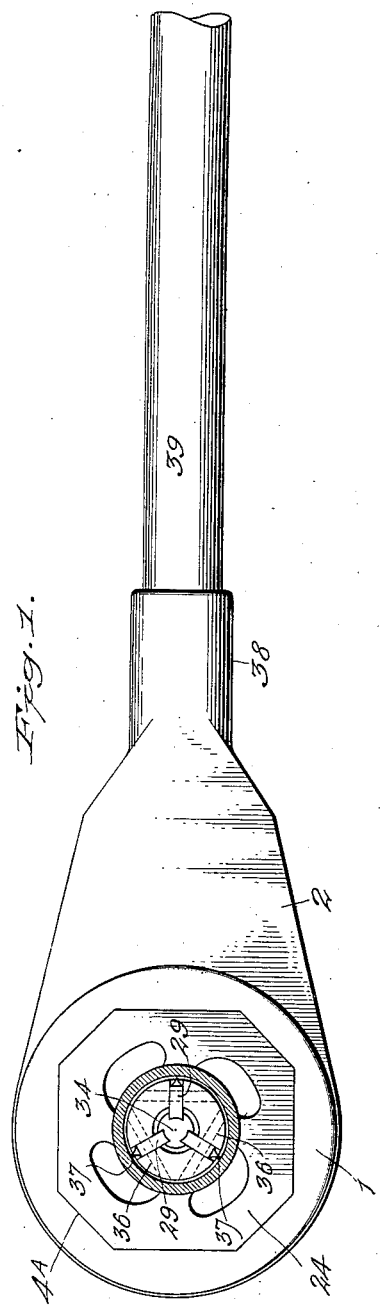
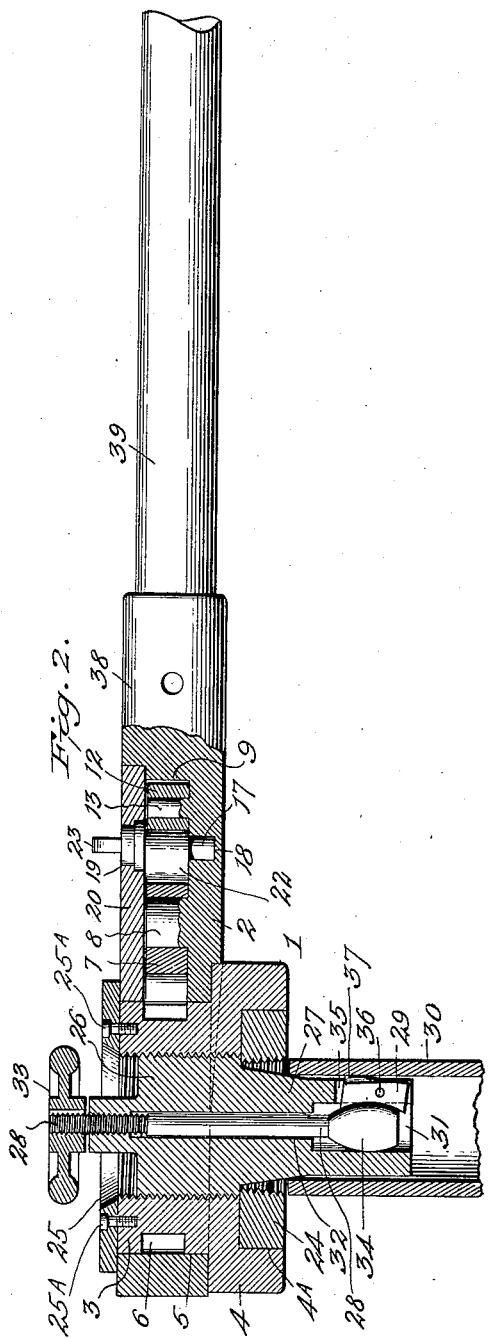

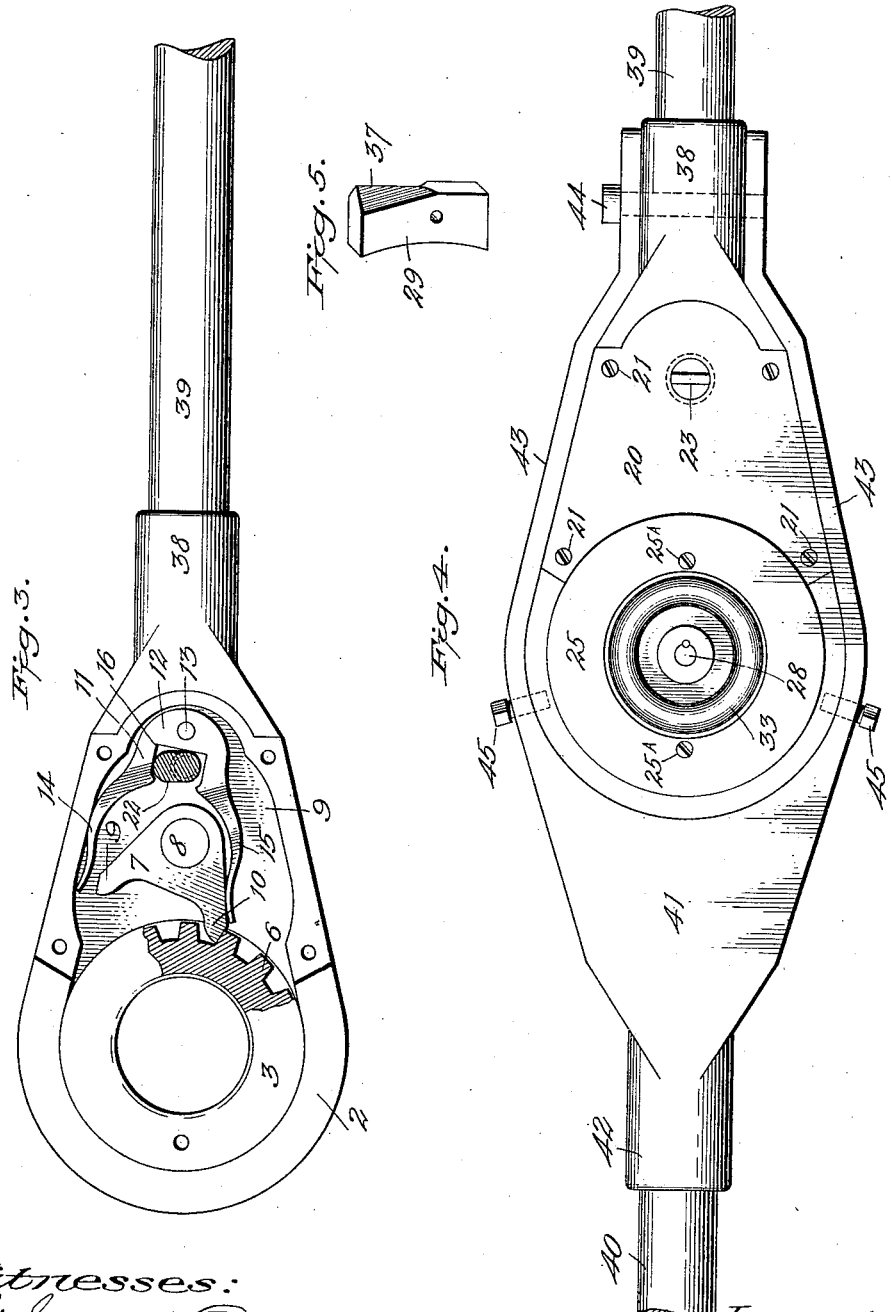

UNITED STATES PATENT OFFICE.

CLARENCE S. COCHRAN, OF DENVER, COLORADO, ASSIGNOR TO THE OCTAGON DIE AND TOOL COMPANY, OF DENVER, COLORADO, A CORPORATION OF COLORADO.

PIPE-THREADING TOOL.

1,017,853.                Specification of Letters Patent.    Patented Feb. 20, 1912.

Application filed October 25, 1910. Serial No. 589,056.

*To all whom it may concern:*

Be it known that I, CLARENCE S. COCHRAN, a citizen of the United States of America, residing in the city and county of Denver and State of Colorado, have invented a new and useful Pipe-Threading Tool, of which the following is a specification.

My invention relates to improvements in pipe threading tools, and the objects of my invention are: First—to provide a reciprocating, ratchet movement, direct acting and reversing pipe holding or gripping, manually actuated die stock or holder, with improved form of pipe thread cutting die. Second—to provide a pipe holding or gripping and threading device provided with a direct acting and reversing reciprocating ratchet movement. Third—to provide a holding or gripping and alinement or guiding device provided with improved form of die and with manually operated movement for use in cutting threads on pipes. Fourth—to provide a combined pipe gripping or holding and self-alining, automatic feeding, reciprocating ratchet movement, direct acting and reversing, manually actuated tool or die stock with improved form of die, operated with one or more handles, and useful for all kinds of pipe thread cutting, but especially designed for cutting threads upon and repairing steam, gas, water, air and other pipes and piping in place in buildings, trenches, walls, railway cars, machinery and other places, and in all places difficult of access where pipe threading tools in common use cannot be applied or used to advantage. I accomplish these objects by the mechanism illustrated in the accompanying drawings, in which:

Figure 1 is a plan view of the improved thread cutting implement. Fig. 2 is a vertical, longitudinal, sectional view thereof. Fig. 3 is a plan view of the opposite side of the implement from that shown in Fig. 1, parts being broken away for the sake of clearer illustration and the cover being omitted to show the pawl and spring and other parts. Fig. 4 is a plan view of the same side as shown in Fig. 3, a supplemental handle being shown secured to the implement; and Fig. 5 is a view of one of the pipe gripping dogs.

Similar letters of reference refer to similar parts throughout the several views.

Referring to the drawings, the numeral 1 indicates a combined die and pipe holding collar, and 2 designates the die and collar holding stock.

The die and pipe holding collar comprises a casting composed of a hub 3 and a flange member 4. The hub 3 is rotatably mounted in a circular opening 5, formed in the stock and fits tightly enough to have a firm bearing therein.

The periphery of the hub 3 is recessed at regular intervals to form teeth 6, which are adapted to be engaged by a pawl 7 that is pivotally mounted on a pin 8 that projects from the bottom of a recess 9 that is formed in the side of the stock to receive the said pawl and other coacting parts to be presently mentioned. This pawl is provided with two ratchet tooth engaging members 9 and 10, which are arranged on its opposite ends at such a distance apart as will adapt them to engage as they are thrown one at a time into engagement with the ratchet teeth 6 of the hub 3. This pawl is preferably arranged to be held with one of its members in engagement with the ratchet teeth by a yoke shaped spring 11, although my invention contemplates the use of any other form of spring for controlling in alternate order the two independently operating lips of the pawl. This spring 11 comprises a solid head portion 12, which is pivotally mounted on a pin 13 that is secured to or projects from the bottom of the recess 9 in the stock in diametrical alinement with the pivotal center of the pawl and of the hub 3.

From the head portion of the spring extend two spring arms 14 and 15, which are adapted to contact one at a time with opposite sides of the pawl, and when one of the arms, say the arm 15, is in engagement with the pawl the other arm bears against the adjacent margin of the recess 9 and is thereby held under tension. Thus, any tendency towards spreading of the arms is overcome and the efficiency of the spring thereby maintained. In order to accomplish this, the two spring arms 14 and 15 are formed to stand a sufficiently greater distance apart than the width of the body of the pawl to permit it to move laterally from one tooth engaging position to the other without striking against the spring arm that is not in resilient contact with it.

The pawl is adapted to be tilted to one or the other of its operating positions to engage the ratchet teeth of the hub 3 and thus effect the rotary movement of the die in one or the other direction when turning the die on or off the pipe.

The yoke spring is arranged so that its two opposite spring arms can be thrown in alternate order into engagement with the sides of the pawl as its engaging position with the ratchet teeth is reversed.

My invention contemplates any means for shifting the spring 11 by which the position of the pawl is reversed and one of the arms of the spring compressed to increase its resilient tension and stability, and while various means for reversing the engagement position of the pawls and of springs might be used, I preferably carry out this feature of my invention as follows: The head portion of the spring is provided with a recess 16 that extends into it centrally between its spring arms, and in this recess a pin 17 is placed, the lower end of which is pivotally mounted in an aperture 18 formed in the bottom of the recess 9 in the stock, while the upper end of this pin extends through an aperture 19 formed through the center of a covering plate 20 that extends over the recess 9 in the stock and is removably secured thereto by screws 21.

That portion of the pin that lies within the recess is provided with a projecting eccentrically arranged cam portion 22 that is adapted to engage the opposite sides of the recess 16 as the pin is turned and thereby throw one of its spring arms against one of the side walls of the recess 9 of the stock and the other spring arm into contact with the adjacent side of the pawl. The engagement of the eccentric 22 with one of the sides of the recess 16 thereby locks and holds the spring firmly in a fixed position with one of its arms in engagement with the pawl, while the other is compressed and held under tension against the adjacent side of the recess 9.

The top of the cam or eccentric pin is provided with a finger clasping knob 23, by which the cam may be manually turned. The turning of this cam pin to shift the spring also tilts the pawl 7 and thereby moves one of its engaging ends out of contact with the teeth of the hub 3 and the opposite end into engagement with the said teeth. Consequently, an operator can throw either tooth lip of the pawl into engagement with the teeth of the die holder by turning the cam pin either to the right or left.

The die holding flange 4 is provided with an axial recess 4$^A$ which may be of a square or hexagonal or octagonal form to receive a pipe cutting die 24. This die receiving recess is provided with a flat bottom wall portion, against which the die rests. A threaded axial bore extends from the die receiving recess 4$^A$ through the hub 3. The threads of this bore are of the same pitch as the die threads, and are adapted to screw loosely onto the standard thread upon the head end of a plug pipe holder, as will presently be shown, and feed the die onto the pipe as fast as it cuts a thread thereon. Thus, as all standard pipe of the sizes of from one to two inches in diameter have the same number of threads per inch, one size of stock is provided with a set of dies and pipe plugs to cut threads on sizes of pipe ranging from one to two inches in diameter.

The threads of all sizes of pipe from one inch to two inches inclusive are eleven to the inch; consequently, a stock fitted with dies for cutting threads on all sizes of pipe from one to two inches inclusive would have a standard thread of eleven pitch.

I preferably use octagonal shaped block dies in my improved thread starting and cutting stock, and consequently have illustrated the peripheral edges of the die blocks and of the recessed seat in the die holder of that form.

A ring plate 25 is removably secured by screws 25$^A$ to the end of the hub 3, which is arranged to extend over the adjacent edge of the die rotating stock and thus secures the die holder rotatably in the stock.

The threaded bore of the die holder is adapted to receive the threaded head end of a pipe holding plug, which comprises the threaded head portion 26, and a pipe plug portion 27. A threaded stem 28 is adapted to be screwed into and out of the plug from its head end and operate a plurality of gripping dogs 29 in such a manner that they will firmly grip the plug to the interior wall of the end of a pipe 30 when the plug is inserted in the end of a pipe in position to cut a thread on it with the die and stock, as will be explained fully hereinafter. This body portion 27 of the plug is preferably made large enough to extend about from two to four inches into the end of a pipe, as shown in Fig. 2.

The pipe holding plugs are made in varying sizes to accommodate pipes of different diameter, but the threaded head portions 26 of the pipe holders are of the same diameter and fit the threaded axial bore of the die holder.

The pipe gripping dogs and their operating stem are preferably arranged in the plug in the following manner: The plug is provided with an axial bore of two diameters 31 and 32. The bore 31 of larger diameter extends into the plug from its inner end and the smaller bore 32 extends from the bore 31 through the opposite end of the plug. The entrance and outer end portion of the bore 32 is threaded and the stem 28 is provided with a threaded end portion that screws loosely but fits snugly through this threaded portion and beyond the head end of the plug to receive a hand wheel 33, which is mounted on and is secured to it. The remainder of the stem fits loosely in the aperture 32 and on the inner terminal end an enlarged oval shaped cam head 34 is formed, which fits loosely in the bore 31 of the plug. The pipe entering end of the plug is provided with three radial slots 35, in which three pipe gripping dogs 29 are pivotally secured by pins 36, which extend transversely through the end of the plug. These dogs are positioned to stand substantially flush with the outside surface of the plug, and they are made wide enough to extend into the bore 31 of the plug, and their inner edges are curved to correspond to the curvature of the cam head 34, with which they contact and by which they are operated to either grip or release the pipe. This cam head 34 is made round and its surface is of an even arc shape, and the stem can be screwed in and out of the plug by grasping its hand wheel and turning it. When the plug has been inserted in the end of a pipe that is to have a thread cut thereon the hand wheel is turned to move the stem and its cam head, which movement causes the outer ends of the dogs, which are formed with sharp edges 37 to move radially outward on their pivotal pins 36 and in engagement with the inner wall of the pipe, and the stem is turned until the sharp edges of the dogs are indented into the pipe with force enough to lock the plug securely to the pipe. When the stem 28 is moved in the opposite direction the dogs 29 are operated to release the pipe and thus free the plug. The cam head is at all times in engagement with the dogs and moves them all in unison, so that the pipe is held concentric to the plug, and also to the axial opening of the die, thus insuring a proper cutting operation of the said die relatively to the pipe.

I preferably use three pipe gripping dogs in the end of the plug, but more or less may be used, if desired.

The stock that supports the die holder is provided with a hollow hub portion 38, in which one end of a handle 39 of any suitable material is fitted. I preferably thread the interior of the hub and use a piece of pipe for a handle, one end of which is threaded to screw into the hub. This handle enables the stock and its pawl to be reciprocated on the ratchet teeth of the die holder to turn the die either onto or off of the end of a pipe and to also turn the die holder onto the threaded head end 26 of the plug when it is fastened onto a pipe.

In order to enable the tool to be manually turned in one direction, as in screwing the die on or off a pipe and the threaded head of the plug with an even intermittent turning movement in either direction, I provide the stock with an additional handle 40, which I arrange diametrically opposite to the handle 39. There are a number of ways in which this handle 40 can be detachably secured to the stock, but in order to avoid a hub or other projecting portion on the opposite side of the stock from the handle 39, which might interfere with the ratchet stroke of the stock on a pipe in a small space, I preferably carry out this feature of my invention in the following manner: A block 41 is employed, one end of which terminates in a hub 42, in which the additional handle 40 is secured. The opposite extremity of the block terminates in a pair of yoke arms 43, which conform to the outline of the stock 2, around which they are adapted to extend, their free ends being secured to the hub 38 by a screw 44. Cap screws 45 pass through the yoke arms and into the rounded end of the stock, and these cap screws form an additional means of securing the block 41 to the stock 2.

The operation of my improved thread starting and cutting tool is as follows: The improved thread cutting tool above described is especially adapted for cutting new threads on or for re-cutting old threads on broken and burst pipe in partitions, floor joists, ceiling beams, in narrow trenches and underneath and in railway cars, where it is extremely inconvenient and oftentimes impossible, owing to the small space in which the pipe is located or to proximity of pipes, rods or of other materials, to repair a break with the tools at present in use. And in such cases the die is inserted in its recess in the holder and a pipe holding plug is screwed into the threaded axial aperture of said holder. The tool is then mounted in operative thread cutting relation to the end of a pipe by placing its plug into the end of a pipe until the die bears against the end of the pipe. The threaded stem 28 is then turned to cause the dogs to move radially outward against the inner wall of the pipe and with force enough to indent the corners of the dogs into the inner wall of the pipe to hold the pipe securely to the plug against rotary and back thrusting movement thereon. The operator then moves the cam pin 17 to throw the spring and pawl into the ratchet teeth of the die holder in position to feed the die onto the pipe and the handle 39 is reciprocated to cut a thread on the end of the pipe, and as the handle is operated in one direction the yoke spring permits the pawl to run over the ratchet teeth, while the opposite movement of the handle causes the pawl to engage the ratchet teeth and turns the die on the threaded head of the plug, which is fixed in the pipe, which is also stationary. This reciprocative movement of the stock is continued until the die has screwed entirely onto the pipe to its full thickness, when it has cut a full standard thread on the pipe. The cam pin is then turned to throw the yoke spring against the opposite wall of the recess in the die stock, which movement reverses the position of the pawl by moving the pawl lip that was in engagement with the ratchet teeth of the die holder out of contact with them and throwing the opposite pawl lip of the pawl into engagement with the ratchet teeth. The operator then continues the reciprocative movement of the die stock and unscrews the die from the thread it has cut on the pipe, after which the plug is withdrawn from the pipe.

My invention is simple, thoroughly practical and provides a tool that has long been needed for repair work; and, while I have illustrated and described the preferred arrangement of my invention, I do not wish to be limited to the construction and arrangement shown, as many changes might be made without departing from the spirit of my invention.

Having described my invention, what I claim as new and desire to secure by Letters Patent is:

1. In combination, a stock carrying a revoluble toothed tool-holder and having a recess at one side of said holder, a double pawl pivotally mounted in said recess, a double spring in said recess, the two portions of said spring being respectively adapted to engage either side of said pawl and the opposite side of said recess, and means for shifting said spring.

2. In combination, a stock carrying a revoluble toothed tool-holder and having a recess at one side of said holder, a double pawl pivotally mounted in said recess, a U-shaped spring in said recess, the arms of said spring being respectively adapted to engage either side of said pawl and the opposite side of said recess, and a revoluble cam engaging the base of said spring for shifting the spring.

3. In a pipe threading tool, the combination of the manually rotating die stock provided with a walled recess on one side, the pawl provided with two teeth engaging lips pivotally mounted in said recess, the yoke shaped spring pivotally mounted in said recess to straddle and arranged with its opposite spring arm in operative engaging relation to said pawl's two ratchet tooth engaging pawl lips, and the cam pin arranged to throw said spring against the walls of said recess in alternate and predetermined order and to throw the spring arm of said yoke shaped spring that is not in engagement with the walls of said recess into operative resilient engagement with the opposite side of said pawl from the abutting arm, with a die holding disk revolubly mounted in said stock provided with a circular row of pawl lip engaging teeth arranged in operative engaging relation to said pawl.

In testimony whereof I affix my signature in presence of two witnesses.

CLARENCE S. COCHRAN

Witnesses:
 G. SARGENT ELLIOTT,
 ADELLA M. FOWLE.

Copies of this patent may be obtained for five cents each, by addressing the "Commissioner of Patents, Washington, D. C."